(12) United States Patent
Koseki

(10) Patent No.: US 9,235,792 B2
(45) Date of Patent: Jan. 12, 2016

(54) FISCAL MEMORY CONTROL USING TWO CONTROLLERS

(75) Inventor: Koji Koseki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 78 days.

(21) Appl. No.: 13/880,950

(22) PCT Filed: Nov. 10, 2011

(86) PCT No.: PCT/JP2011/076471
§ 371 (c)(1),
(2), (4) Date: Apr. 22, 2013

(87) PCT Pub. No.: WO2012/067169
PCT Pub. Date: May 24, 2012

(65) Prior Publication Data
US 2013/0222854 A1    Aug. 29, 2013

(30) Foreign Application Priority Data

Nov. 19, 2010  (JP) ................................ 2010-258956

(51) Int. Cl.
| | |
|---|---|
| G06K 15/02 | (2006.01) |
| G06Q 20/20 | (2012.01) |
| G06Q 20/38 | (2012.01) |
| G06F 21/78 | (2013.01) |

(52) U.S. Cl.
CPC .......... *G06K 15/1886* (2013.01); *G06Q 20/207* (2013.01); *G06Q 20/389* (2013.01); *G06F 21/78* (2013.01)

(58) Field of Classification Search
CPC .................................................. G06K 15/1886
See application file for complete search history.

(56) References Cited

U.S. PATENT DOCUMENTS

| | | |
|---|---|---|
| 2004/0255141 A1 | 12/2004 | Hodder et al. |
| 2008/0126749 A1* | 5/2008 | Tom et al. ...................... 712/30 |
| 2009/0033980 A1 | 2/2009 | Morris et al. |
| 2009/0182640 A1 | 7/2009 | Hodder et al. |
| 2010/0134821 A1 | 6/2010 | Wasamoto et al. |

FOREIGN PATENT DOCUMENTS

| | | |
|---|---|---|
| CN | 1540595 | 10/2004 |
| EP | 0 180 978 A2 | 5/1986 |
| JP | 06-004776 A | 1/1994 |
| JP | 2000-194946 A | 7/2000 |
| JP | 2008-276593 A | 11/2008 |

* cited by examiner

*Primary Examiner* — Nicholas Pachol

(57) ABSTRACT

High speed reading of fiscal information from memory is enabled while complying with financial regulations. Including fiscal memory 10 that stores fiscal information, a first control unit 5 that controls communication with the host computer 2 and operates at a first processing speed, and a second control unit 7 that controls operation of the fiscal memory 10 and operates at a second processing speed that is lower than the first processing speed, the second control unit 7 performs a write process writing fiscal information received from the host computer 2 to fiscal memory 10, and the first control unit 5 executes a read process reading the fiscal information stored in the fiscal memory 10 without involving processing by the second control unit 7.

13 Claims, 4 Drawing Sheets

FISCAL MEMORY CONTROL USING TWO CONTROLLERS

TECHNICAL FIELD

The present invention relates to a method of controlling fiscal memory in a fiscal printer that prints receipts and has a function for storing fiscal information related to sales transactions. The invention also relates to a fiscal control circuit board and fiscal printer that apply this fiscal memory control method.

BACKGROUND ART

In addition to simply printing text similarly to a common printer, fiscal printers also have a function for storing and holding payment information (fiscal information) such as the collected tax amount and the total sale amount related to sales transactions of products and services, for example, and are used as cash register printers in POS systems, for example.

Because the fiscal information that must be stored is determined by local law (referred to as "financial regulations" below) and may be used for tax audits, for example, it is stored in fiscal memory devices, which are nonvolatile memory devices that are protected to prevent external access and tampering with stored content.

A fiscal printer typically has a communication control unit that controls communication with a host computer such as a POS system computer, and a memory control unit that controls writing and reading fiscal information in fiscal memory.

The communication control unit has an application CPU with a function for controlling data communication with the host computer. Financial regulations also prohibit the application CPU from directly writing fiscal information to fiscal memory in order to prevent tampering. The memory control unit therefore has a memory control CPU that writes fiscal information to fiscal memory separately from the application CPU.

CITATION LIST

Patent Literature

PTL 1: Japanese Unexamined Patent Appl. Pub. JP-A-2008-276593.

SUMMARY OF INVENTION

Technical Problem

FIG. 6 schematically describes the control system of a fiscal printer 101 according to the related art. For example, fiscal information related to the sales transaction supplied from the host computer 102 side for each payment process is sent to the memory control CPU 107 of the memory control unit 104 by the application CPU 105 of the communication control unit 103, and the memory control CPU 107 writes the received fiscal information to fiscal memory 110.

The fiscal information recorded in fiscal memory 110 is read at appropriate times in order to be regularly submitted for tax audits and other purposes as described above. In the fiscal printer 101 shown in FIG. 6, the memory control CPU 107 reads and sends fiscal information from the fiscal memory 110 to the application CPU 105.

A CPU with a relatively low processing speed compared with the application CPU 105 that requires a high speed processor can be used as the memory control CPU 107 that controls the fiscal information writing process at different times. However, because the fiscal information is read and supplied in batches for processing after accumulating in memory for a certain period of time, an extremely long time is required for processing when using such a slow CPU. However, using a fast memory control CPU in order to handle infrequent reading processes is impractical in terms of circuit design.

Note that "processing speed" is used herein to indicate at least the communication speed related to receiving fiscal information.

An object of the invention is to provide technology that enables high speed reading of fiscal information recorded in fiscal memory while conforming to financial regulations.

Solution to Problem

The present invention is directed to solving the foregoing problem as described below.

(1): A fiscal memory control method for a fiscal printer that has fiscal memory that stores fiscal information, a first control unit that controls at least communication with a host computer and operates at a first processing speed, and a second control unit that controls operation of at least the fiscal memory and operates at a second processing speed that is slower than the first processing speed, the control method characterized by:

storing the fiscal information in the fiscal memory by means of the first control unit receiving the fiscal information from the host computer and passing the fiscal information to the second control unit, and the second control unit executing a write process that writes the fiscal information passed from the first control unit to the fiscal memory; and the first control unit executing a read process of reading the fiscal information stored in the fiscal memory from the fiscal memory without involving processing by the second control unit.

This method uses the first control unit having a faster processing speed than the second control unit only to read fiscal information from the fiscal memory. The time required to read data can therefore be greatly reduced even when the amount of fiscal information is great. In addition, because the first control unit only reads fiscal information, there is no conflict with financial regulations that prohibit only writing to fiscal memory by the first control unit.

(2): The fiscal memory control method described in (1), characterized by:

a first communication path that connects the first control unit and the fiscal memory through the second control unit, and a second communication path that connects the first control unit and the fiscal memory without going through the second control unit, can be selected;

selecting the first communication path when the second control unit executes the write process; and selecting the second communication path when the first control unit executes the read process.

By appropriately inserting a selector between the second control unit and the fiscal memory, the control method described above can be implemented when the fiscal memory is serial, parallel, or a combination thereof.

(3): The fiscal memory control method described in (2), characterized by the second control unit controlling selection of the first communication path and second communication path.

Financial regulations require that the process of establishing a communication path connecting the fiscal memory to the first control unit through the second control unit, that is, the process of establishing an environment enabling writing to fiscal memory, must be executed by the second control unit. This configuration therefore enables compliance with financial regulations.

(4): The fiscal memory control method described in any one of (1) to (3), characterized by the second control unit determining if the fiscal memory write process can be executed.

Direct access to fiscal memory by the first control unit is possible while the first control unit is reading fiscal information from fiscal memory. However, writing by means of the first control unit is not possible whether or not tampering is the intent by prohibiting writing to fiscal memory by the second control unit except when executing the write process. Financial regulations require that the process that permits writing to fiscal memory is executed by the second control unit. This aspect of the invention can therefore comply with financial regulations.

Another aspect of the invention is described below.

(5): A fiscal printer that is connected to a host computer and characterized by comprising:

fiscal memory that stores fiscal information;

a first control unit that controls at least communication with a host computer and operates at a first processing speed; and a second control unit that controls operation of at least the fiscal memory and operates at a second processing speed that is slower than the first processing speed, wherein:

when storing the fiscal information to the fiscal memory, the first control unit passes the fiscal information received from the host computer to the second control unit, and the second control unit executes a write process that writes the fiscal information passed from the first control unit to the fiscal memory; and the first control unit executing a read process of reading the fiscal information stored in the fiscal memory from the fiscal memory without involving processing by the second control unit.

This aspect of the invention has the same operational effect as described in (1) above.

(6): The fiscal printer described in (5), characterized by further comprising:

a first communication path that connects the first control unit and the fiscal memory through the second control unit;

a second communication path that connects the first control unit and the fiscal memory without going through the second control unit; and a selector that can select either the first communication path or the second communication path;

wherein the first communication path is selected when the second control unit executes the write process, and the second communication path is selected when the first control unit executes the read process.

This aspect of the invention has the same operational effect as described in (2) above.

(7): The fiscal printer described in (6), characterized by the second control unit controlling the selector to select either the first communication path or the second communication path.

This aspect of the invention has the same operational effect as described in (3) above.

(8): The fiscal printer described in any one of (5) to (7), characterized by the second control unit determining if the fiscal memory write process can be executed.

This aspect of the invention has the same operational effect as described in (4) above.

DESCRIPTION OF EMBODIMENTS

A preferred embodiment of a fiscal printer applying the fiscal memory control method according to the invention is described below with reference to the accompanying figures.

Figure 1:
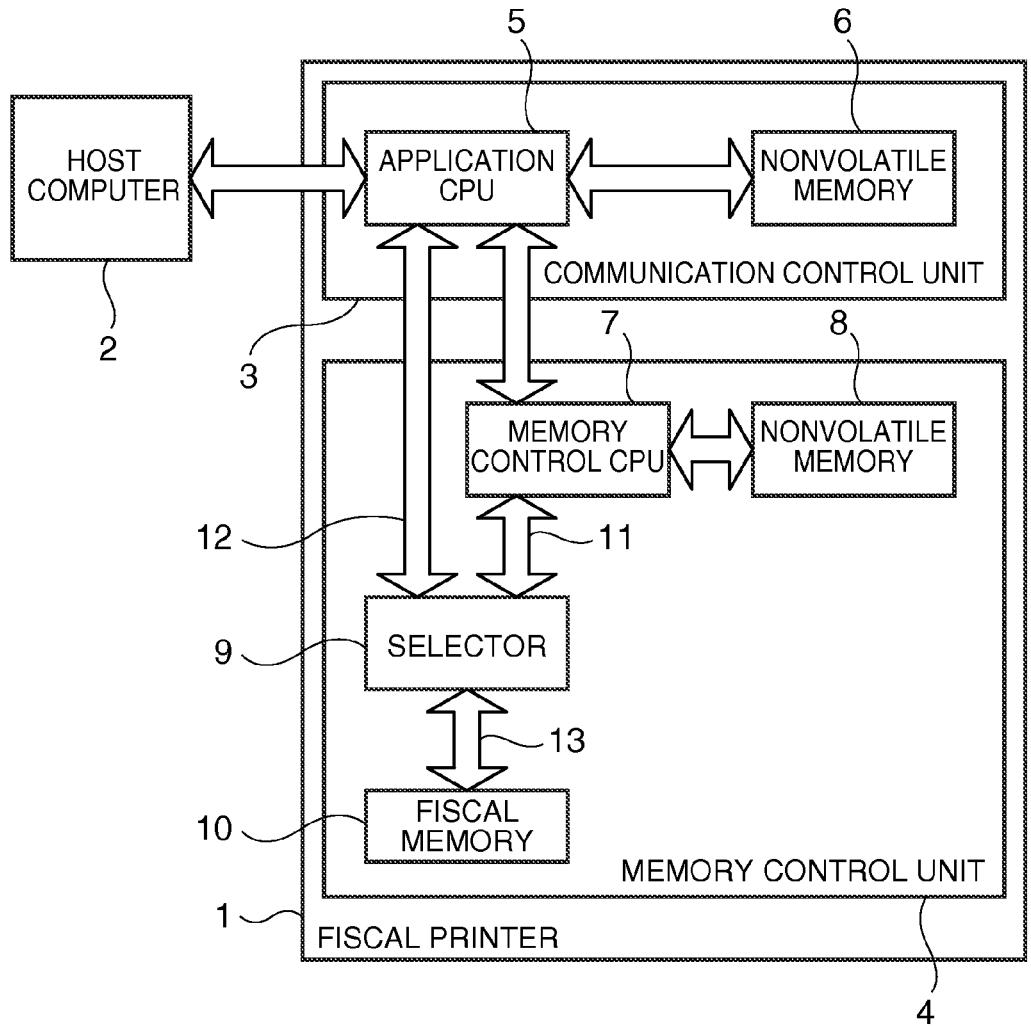
FIG. 1 schematically describes the control system of a fiscal printer according to a preferred embodiment of the invention.

FIG. 1 schematically describes the control system of a fiscal printer 1 according to a preferred embodiment of the invention. The fiscal printer 1 is connected over a bus to enable two-way communication with the host computer 2 of a POS system, for example, and has functions for printing print data related to sale transactions supplied from the host computer 2 as sale receipts, and storing and holding fiscal information related to the sale transaction supplied from the host computer 2 for each payment process.

A "bus" is used herein to collectively mean a control bus, data bus, and address bus with no particular distinction therebetween.

The fiscal printer 1 has a communication control unit 3 that controls communication with the host computer 2, and a memory control unit 4 that controls processes for writing and reading fiscal information to fiscal memory 10.

The communication control unit 3 includes an application CPU 5 (first control unit) and nonvolatile memory 6 connected over a bus. The application CPU 5 has a function for controlling communication with the host computer 2. Firmware, for example, for executing these control functions is stored in nonvolatile memory 6, and is accessed as needed by the application CPU 5 to read data. The nonvolatile memory 6 could be a mask ROM or other non-rewritable device, or rewritable memory such as a programmable ROM or flash ROM device.

The memory control unit 4 includes a memory control CPU 7 (second control unit), nonvolatile memory 8, selector 9, and fiscal memory 10.

The memory control CPU 7 is connected by a bus enabling two-way communication with the application CPU 5 of the communication control unit 3. The processing speed (first processing speed) of the application CPU 5 is faster than the processing speed (second processing speed) of the memory control CPU 7. The functions of the memory control CPU 7 at least include writing fiscal information to fiscal memory 10, and enabling/disabling write protection of the fiscal memory 10 (enabling/disabling the write process).

The nonvolatile memory 8 is connected by a bus enabling two-way communication with the memory control CPU 7. Firmware for executing the functions of the memory control CPU 7 is stored in nonvolatile memory 8, and is read as needed by the memory control CPU 7. The nonvolatile memory 8 could be a mask ROM or other non-rewritable device, or rewritable memory such as a programmable ROM or flash ROM device.

The fiscal memory 10 is rendered by rewritable nonvolatile memory such as programmable ROM or flash ROM.

The selector 9 is connected through first bus 11 to enable two-way communication with the memory control CPU 7; through second bus 12 to enable two-way communication with the application CPU 5; and through third bus 13 to enable two-way communication with the fiscal memory 10. The selector 9 is configured to receive a switching command from the application CPU 5 and connect the third bus 13 with the first bus 11 or second bus 12. More specifically, a communication path (first communication path) connecting the fiscal memory 10 through the memory control CPU 7 to the application CPU 5, and a communication path (second communication path) connecting the fiscal memory 10 with the application CPU 5 without going through the memory control CPU 7, can be selected according to this switching command.

The selector 9 may be rendered with integrated circuits that electrically select a communication path, or with switches or other mechanical means of selecting a communication path.

In this embodiment of the invention writing fiscal information to fiscal memory 10 is executed by the memory control CPU 7 according to financial regulations. Reading fiscal information from the fiscal memory 10 is executed by the application CPU 5, which has a faster processing speed. As a result, a large amount of fiscal information can be quickly processed even when it must be read from fiscal memory 10.

More specifically, fiscal information is written to fiscal memory 10 using the memory control CPU 7 at approximately 1 Mbps, and fiscal information is read from fiscal memory 10 using the application CPU 5 at approximately 40 Mbps. Note that these speeds are offered by way of example only based on current device performance, and the communication speed is not limited in any way with respect to further improvement in device performance.

The application CPU 5, memory control CPU 7 and fiscal memory 10 communicate bidirectionally using a packet communication method. Packets that are sent from the application CPU 5 to the memory control CPU 7, and from the memory control CPU 7 to the fiscal memory 10, are defined as transmission packets 20, and packets sent from the fiscal memory 10 to the memory control CPU 7, and from the memory control CPU 7 to the application CPU 5, are defined as reception packets 30.

Figure 2:
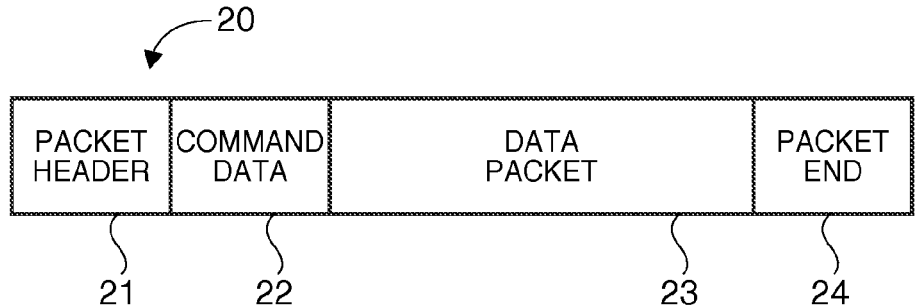
FIG. 2 shows an example of the data structure of a transmission packet used in the fiscal printer shown in FIG. 1.

As shown in FIG. 2, the transmission packets 20 have a data structure including a packet header 21, command data 22, data packet 23, and packet end 24.

The packet header 21 is unique data that identifies the transmission packets 20, and is a defined value such as 07h (where h denotes a hexadecimal value).

The command data 22 is data for recognizing particular commands, and is, for example, an 8-bit value that can identify up to 256 commands. For example, a value of 01h identifies a command for writing fiscal information to fiscal memory 10, 02h identifies a command for reading fiscal information from fiscal memory 10, 03h identifies a command for switching the selector 9 so that the fiscal memory 10 is connected to the application CPU 5 through the memory control CPU 7, and 04h identifies a command for switching the selector 9 so that the fiscal memory 10 is connected to the application CPU 5 without going through the memory control CPU 7.

The data packet 23 contains the data of a variable length corresponding to the command type. The fiscal information is carried in the data packet 23.

The packet end 24 is a unique value, such as FFh, indicating the end of the packet.

Figure 3:
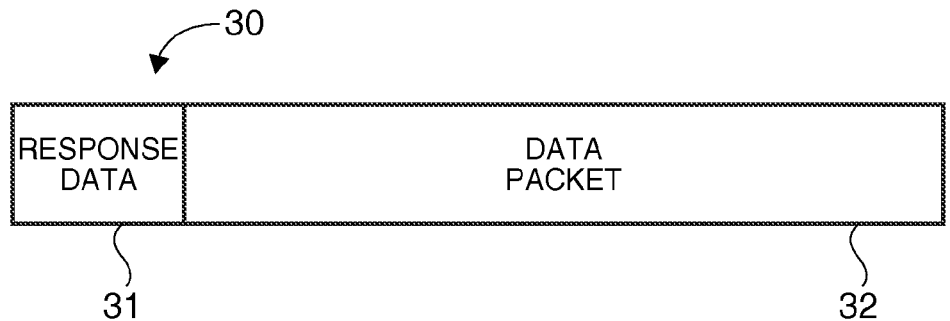
FIG. 3 shows an example of the data structure of a reception packet used in the fiscal printer shown in FIG. 1.

As shown in FIG. 3, reception packets 30 may have a data structure consisting of response data 31 and a data packet 32.

The response data 31 is a value identifying a response to the command denoted by the command data 22 of the transmission packet 20. For example, if the command is for data transmission, a response data 31 value of 00h indicates that the data was received normally, and 01h indicates there was an error such as a loss of data.

The data packet 32 is appended when returning data in response to the transmission packet 20 is necessary. Fiscal information read from the fiscal memory 10 is carried in the data packet 32 in the memory control method according to the invention.

The fiscal memory 10 control method according to this embodiment of the invention is described next with reference to FIG. 4 and FIG. 5. Note that the fiscal printer 1 according to this embodiment of the invention is configured so that, except when executing a write process, fiscal memory 10 write protection is enabled by the memory control CPU 7, and the selector 9 is set to connect the first bus 11 and third bus 13 (that is, so that fiscal memory 10 and application CPU 5 are connected through the memory control CPU 7).

Figure 4:
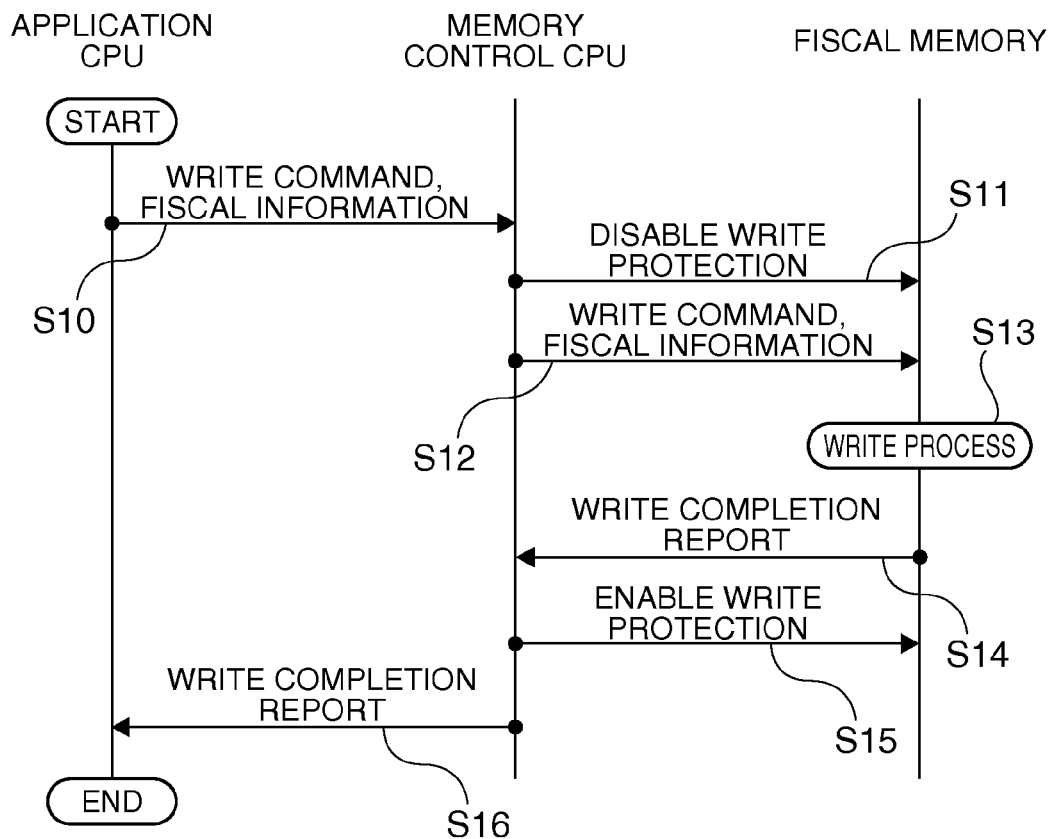
FIG. 4 is a sequence diagram showing the process executed in the fiscal printer in FIG. 1 to write fiscal information to fiscal memory.

FIG. 4 shows the flow of application CPU 5, memory control CPU 7, and fiscal memory 10 operation when writing fiscal information to fiscal memory 10.

The application CPU 5 first sends a write command and fiscal information to the memory control CPU 7 (S10). For example, the application CPU 5 sends the foregoing transmission packet 20 containing command data 22 denoting the write command and a data packet 23 containing fiscal information. A configuration that first sends only a write command to notify the memory control CPU 7 of the start of a write process, and sends the fiscal information after receiving a confirmation response from the memory control CPU 7, is also conceivable.

The memory control CPU 7 receives the write command notice from the application CPU 5, and sends a command to the fiscal memory 10 to disable write protection of the fiscal memory 10 (S11). The memory control CPU 7 disables write protection to conform with financial regulations that prohibit writing directly to fiscal memory 10 by means of the application CPU 5.

Next, the memory control CPU 7 sends a write command and fiscal information to the fiscal memory 10 (S12). The memory control CPU 7 sends, for example, the foregoing transmission packet 20 containing command data 22 denoting a write command and a data packet 23 containing fiscal information.

Alternatively, a configuration in which the fiscal memory 10 sends a response reporting that write protection was disabled, and sending the transmission packet 20 starts after receiving this response, is also conceivable. Further alternatively, a configuration that first sends the write command and reports starting the write process to the fiscal memory 10, and sends the fiscal information after receiving a confirmation response from the fiscal memory 10, is also conceivable.

The fiscal memory 10 writes fiscal information based on the write command sent from the memory control CPU 7 (S13), and sends response data 31 indicating that writing was completed successfully to the memory control CPU 7 (S14).

When the memory control CPU 7 receives a report indicating successful completion of the write process from the fiscal memory 10, it sends a command enabling write protection to the fiscal memory 10 (S15). Enabling fiscal memory 10 write protection except when executing a write process assures the integrity of the fiscal memory 10 that is required by financial regulations.

The memory control CPU 7 then sends response data 31 indicating successful completion of the write process to the application CPU 5 (S16). Note that a configuration in which the fiscal memory 10 sends a response reporting that write protection was enabled to the memory control CPU 7, and the memory control CPU 7 sends the response data 31 after this response is received, is also conceivable.

When the application CPU 5 receives response data 31 indicating completion of the write process from the memory control CPU 7, the fiscal information write process ends.

When enabling or disabling write protection of the fiscal memory (determining if the write process can be executed) in the embodiment described above, the memory control CPU 7 sends the appropriate command to the fiscal memory 10, but the method determining execution of the write process is not limited thereto. For example, a configuration in which the potential state of a specific terminal of the fiscal memory 10 is used to enable and disable the write process, and the memory control CPU 7 changes the potential of this terminal according to the decision, is also conceivable.

Figure 5:
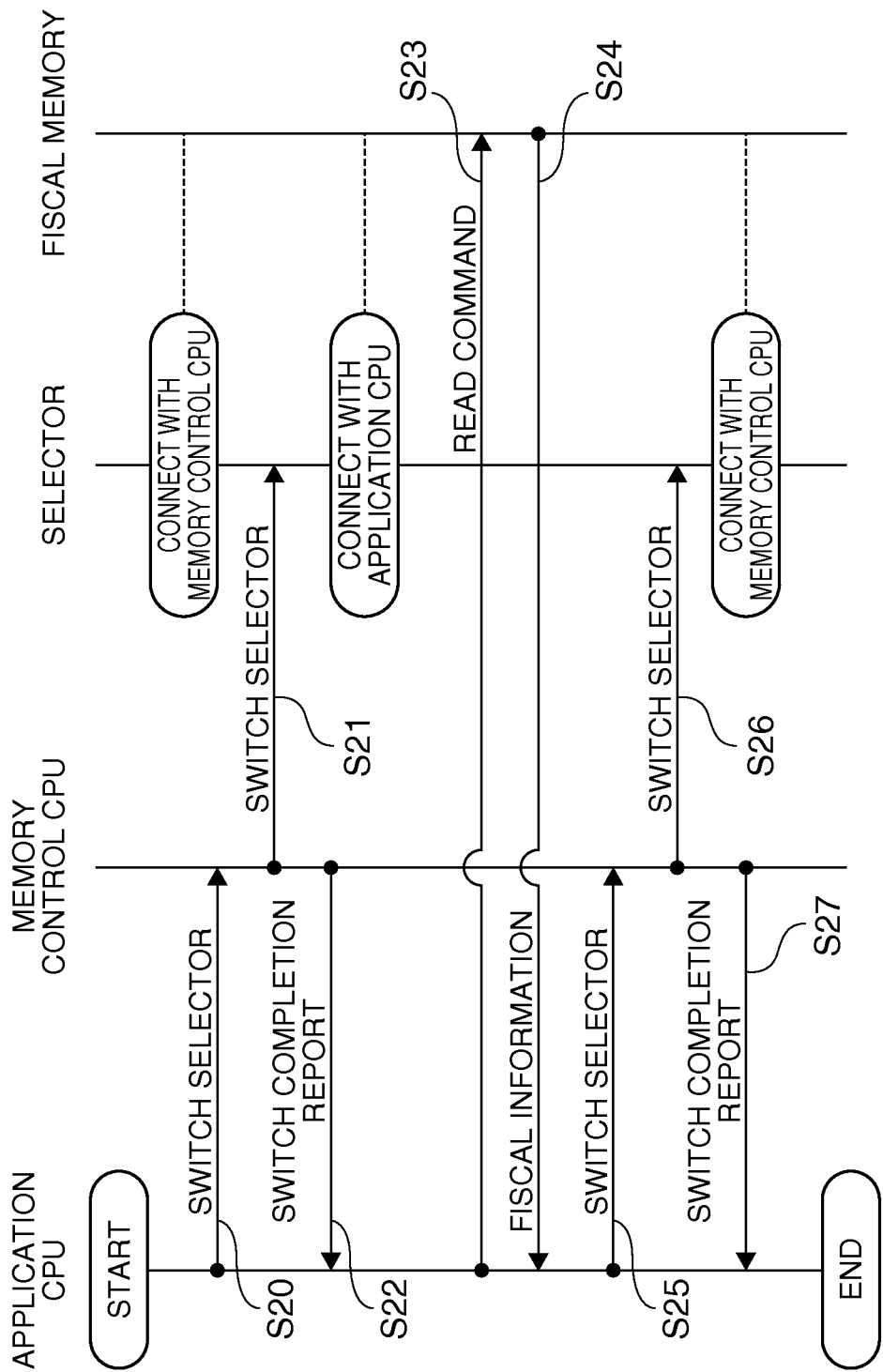
FIG. 5 is a sequence diagram showing the process executed in the fiscal printer in FIG. 1 to read fiscal information to fiscal memory.
Figure 6:
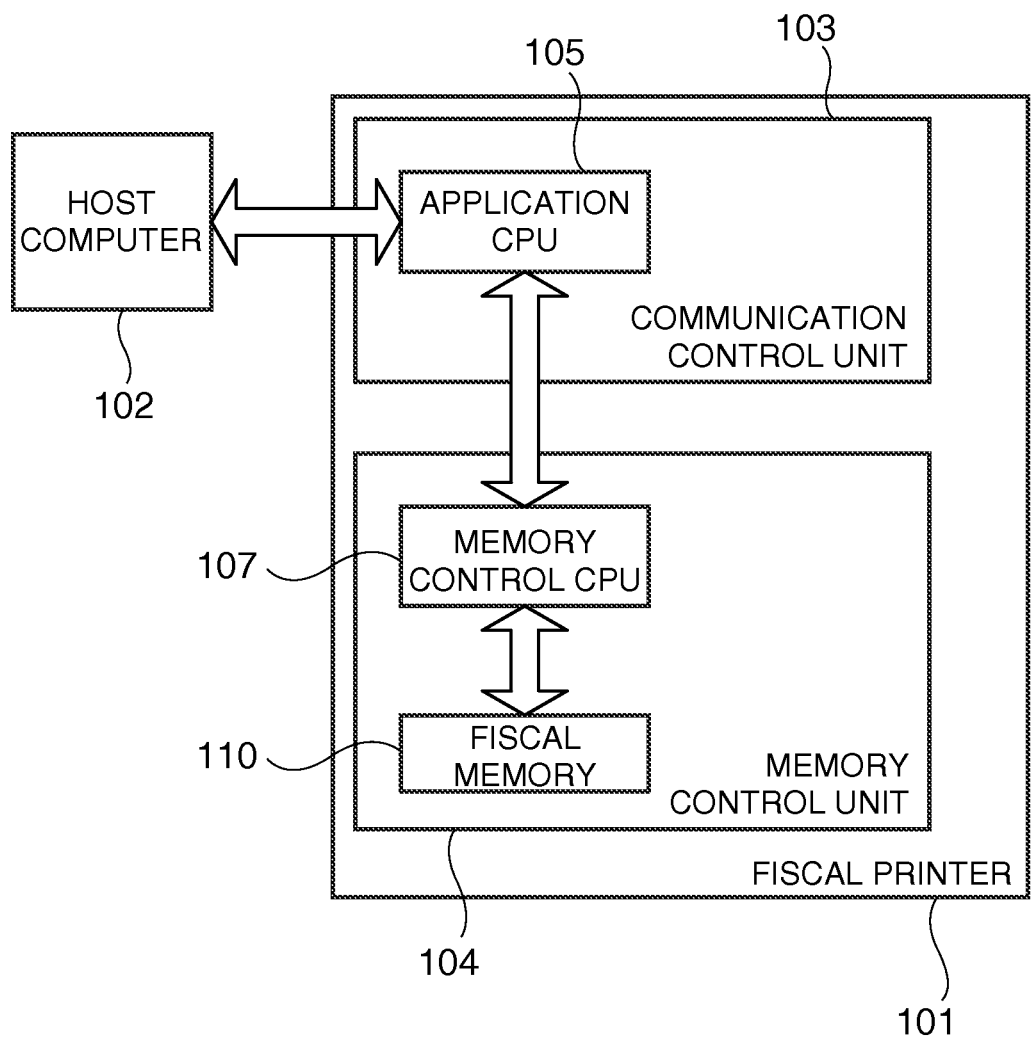
FIG. 6 schematically describes the control system of a fiscal printer according to the related art.

FIG. 5 shows the flow of application CPU 5, memory control CPU 7, selector 9, and fiscal memory 10 operation when reading fiscal information from fiscal memory 10.

The application CPU 5 first sends a selector switching command to the memory control CPU 7 (S20). The memory control CPU 7 controls the selector 9 so that when a selector switching command is received a communication path (second communication path) connecting the fiscal memory 10 to the application CPU 5 (connecting the second bus 12 and third bus 13) without going through the memory control CPU 7 (S21).

When switching the selector 9 is completed, the memory control CPU 7 sends response data indicating the switch to the application CPU 5 (S22).

When response data 31 indicating that the selector 9 switched is received from the memory control CPU 7, the application CPU 5 sends the read command to the fiscal memory 10 (S23). For example, the transmission packet 20 described above can be used to include data indicating the read address and amount of read data in the data packet 23.

Based on the read command sent from the application CPU 5, the fiscal memory 10 sends the specified fiscal information to the application CPU 5 (S24). The fiscal information can be sent using a reception packet 30 including the response data 31 indicating a response to the read command, and a data packet 32 containing the fiscal information, for example.

Because the selector 9 creates a communication path that does not go through the memory control CPU 7, reading fiscal information from the fiscal memory 10 can be done by the application CPU 5, which has a faster processing speed than the memory control CPU 7. The time required to read data can therefore be greatly reduced when there is a large amount of fiscal information. This configuration also does not violate financial regulations prohibiting the application CPU 5 from writing to fiscal memory 10.

When completion of reading fiscal information from the fiscal memory 10 is confirmed, the application CPU 5 sends a selector switching command to the memory control CPU 7 (S25). When this selector switching command is received, the memory control CPU 7 controls the selector 9 to form a communication path (first communication path, connecting the first bus 11 and third bus 13) whereby the fiscal memory 10 is connected to the application CPU 5 through the memory control CPU 7 (S26).

The selector switching command sent in S21, and the selector switching command sent in S26, could have the same data content or different data content according to the specifications of the selector 9. Because the selector 9 only switches between two states, the same data content can be used with no problem if the selector 9 is configured to change state each time a switching command is input.

When the selector 9 finishes switching, the memory control CPU 7 sends response data indicating the same to the application CPU 5 (S27). The application CPU 5 ends the fiscal information reading process when response data indicating that the selector 9 switched states is received from the memory control CPU 7.

When a communication path connecting the fiscal memory 10 to the application CPU 5 without going through the memory control CPU 7 is formed (S21 to S26 in FIG. 5), the application CPU 5 can directly access the fiscal memory 10. However, write protection of the fiscal memory 10 is enabled except when executing the write process as described above. Writing by the application CPU 5 is therefore not possible whether or not the intent is tampering, and financial regulations are therefore not violated.

The process creating a communication path that connects the fiscal memory 10 to the application CPU 5 without going through the memory control CPU 7, or more specifically a process creating an environment enabling the memory control CPU 7 to write to the fiscal memory 10, must be executed by the memory control CPU 7 to conform with financial regulations. This embodiment of the invention can comply with financial regulations because switching control of the selector 9 is handled by the memory control CPU 7.

The fiscal memory 10 control method according to the invention is described with reference to a preferred embodiment thereof above, but this embodiment of the invention is intended to facilitate understanding the invention and the invention is not limited thereto. The invention can be modified and improved in many ways without departing from the scope of the accompanying claims, and all such equivalent embodiments are included in the scope of the invention.

For example, serial nonvolatile memory is used in the foregoing fiscal printer 1, and the selector 9 can be omitted if a data line for sending fiscal information from the memory control CPU 7 to the fiscal memory 10, and a separate data line for sending fiscal information from the fiscal memory 10 to the application CPU 5, are provided. In this case the fiscal memory 10 can be configured so that fiscal information is received from the memory control CPU 7 using a write-only data line when a write command is input, and fiscal information is sent to the application CPU 5 using a read-only data line when a read command is input.

Because writing fiscal information is done by the memory control CPU 7 and reading fiscal information is done by the application CPU 5 in this configuration, the time required to read fiscal information can be shortened without conflicting with financial regulations.

The foregoing embodiment describes an example in which a single nonvolatile memory device is used as fiscal memory 10. However, a configuration that uses serial nonvolatile memory devices (such as flash ROM) and parallel nonvolatile memory (such as OTPROM), for example, is also conceivable. In this case the selector 9 is configured so that a communication path connecting to the application CPU 5 through the memory control CPU 7, and a communication path connecting to the application CPU 5 without going through the memory control CPU 7, can be rendered through both types of nonvolatile memory.

In this case, anti-tampering data such as digital signatures that are essential to financial regulations is stored to parallel nonvolatile memory, other types of data can be recorded to serial nonvolatile memory, and the data reading speed can be improved while maintaining the security required by financial regulations.

The foregoing embodiment describes an example in which the application CPU 5 controls communication with the host computer 2. In addition to this function, however, the application CPU 5 may also have a function that controls the printing operation of the fiscal printer 1.

The invention claimed is:

1. A fiscal memory control method for a fiscal printer that has fiscal memory that stores fiscal information, a first controller that controls at least communication with a host computer and operates at a first processing speed, and a second controller that controls operation of at least a writing operation of writing fiscal information to the fiscal memory and operates at a second processing speed that is slower than the first processing speed, the control method comprising:

storing the fiscal information in the fiscal memory by means of the first controller receiving the fiscal information from the host computer; and selecting a first communication path or a second communication path for the fiscal information, the first communication path being configured to connect the first controller to the fiscal memory through the second controller, and the second communication path being configured to connect the first controller to the fiscal memory bypassing the second controller;

wherein the first communication path is selected for the second controller to execute a write process of writing fiscal information to the fiscal memory, only the write process being executed on the first communication path, and wherein the second communication path is selected for the first controller to execute a read process of reading fiscal information from the fiscal memory, only the read process being executed on the second communication path.

2. The fiscal memory control method described in claim 1, wherein:

the second controller controlling selection of the first communication path and second communication path.

3. The fiscal memory control method described in claim 1, wherein:

the second controller determining if the fiscal memory write process can be executed.

4. The fiscal memory control method described in claim 1, wherein:

the first communication path is selected except when the first controller executes the read process.

5. A fiscal printer that is connectable to a host computer, comprising:

fiscal memory that stores fiscal information;

a first controller that controls at least communication with the host computer and operates at a first processing speed;

a second controller that controls operation of at least a writing operation of writing fiscal information to the fiscal memory and operates at a second processing speed that is slower than the first processing speed;

a first communication path for the fiscal information, the first communication path being configured to connect the first controller to the fiscal memory through the second controller;

a second communication path for the fiscal information, the second communication path being configured to connect the first controller to the fiscal memory bypassing the second controller; and a selector configured to select either the first communication path or the second communication path, the selector being configured to select the first communication path in a write process of writing fiscal information to the fiscal memory, and to select the second communication path in a read process of reading fiscal information from the fiscal memory, only the write process being executed on the first communication path and only the read process being executed on the second communication path.

6. The fiscal printer described in claim 5, wherein:

the second controller controlling the selector to select either the first communication path or the second communication path.

7. The fiscal printer described in claim 5, wherein:

the second controller determining if the fiscal memory write process can be executed.

8. The fiscal printer described in claim 5, wherein:

the first communication path is selected except when the first controller executes the read process.

9. A fiscal control circuit board that is connectable to a host computer, comprising:

fiscal memory that stores fiscal information;

a first controller that controls at least communication with the host computer and operates at a first processing speed;

a second controller that controls operation of at least a writing operation of writing fiscal information to the fiscal memory and operates at a second processing speed that is slower than the first processing speed;

a first communication path for the fiscal information, the first communication path being configured to connect the first controller to the fiscal memory through the second controller;

a second communication path for the fiscal information, the second communication path being configured to connect the first controller to the fiscal memory bypassing the second controller; and a selector configured to select either the first communication path or the second communication path, the selector being configured to select the first communication path in a write process of writing fiscal information to the fiscal memory, and to select the second communication path in a read process of reading fiscal information from the fiscal memory, only the write process being executed on the first communication path and only the read process being executed on the second communication path.

10. The fiscal control circuit board described in claim 9, wherein:

the second controller controlling the selector to select either the first communication path or the second communication path.

11. The fiscal control circuit board described in claim 9, wherein:

the second controller determining if the fiscal memory write process can be executed.

12. The fiscal control circuit board described in claim 9, wherein:

the first controller and the second controller being mounted on separate circuit boards.

13. The fiscal control circuit board described in claim 9, wherein:

the first communication path is selected except when the first controller executes the read process.

* * * * *